(12) United States Patent
Russo et al.

(10) Patent No.: US 11,752,924 B2
(45) Date of Patent: Sep. 12, 2023

(54) LATCHING DEVICE AND METHOD FOR AUTOMATIC SECUREMENT OF A CONTAINER TO A CONTAINER CHASSIS

(71) Applicant: Mi-Jack Products, Inc., Hazel Crest, IL (US)

(72) Inventors: James T. Russo, Chicago Heights, IL (US); Matthew M. Moran, Woodridge, IL (US); William A. Byers, Valparaiso, IN (US)

(73) Assignee: MI-JACK PRODUCTS, INC., Hazel Crest, IL (US)

( * ) Notice: Subject to any disclaimer, the term of this patent is extended or adjusted under 35 U.S.C. 154(b) by 423 days.

(21) Appl. No.: 17/141,904

(22) Filed: Jan. 5, 2021

(65) Prior Publication Data
US 2022/0212594 A1 Jul. 7, 2022

(51) Int. Cl.
*B60P 7/08* (2006.01)
*B60P 7/13* (2006.01)

(52) U.S. Cl.
CPC ............... *B60P 7/13* (2013.01); *B60P 7/132* (2013.01)

(58) Field of Classification Search
CPC .. B60P 7/13; B60P 7/132; B60P 7/0892; B60P 7/10; B60P 7/18; E05B 83/02
USPC ............... 410/69, 70, 72–73, 76, 80, 82, 83
See application file for complete search history.

(56) References Cited

U.S. PATENT DOCUMENTS

| | | | |
|---|---|---|---|
| 1,988,942 A * | 1/1935 | Fildes | B60P 7/13 410/72 |
| 2,424,429 A | 7/1947 | Bamberg | |
| 3,158,106 A | 11/1964 | Clejan | |
| 3,331,333 A * | 7/1967 | Coulson | B60P 7/132 410/83 |
| 3,399,921 A | 9/1968 | Trost et al. | |
| 3,614,153 A | 10/1971 | Tantlinger et al. | |
| 3,667,401 A | 6/1972 | Schwiebert et al. | |
| 3,719,385 A | 3/1973 | Carr | |
| 4,047,748 A | 9/1977 | Whaley et al. | |

(Continued)

FOREIGN PATENT DOCUMENTS

| | | |
|---|---|---|
| EP | 1 243 466 A2 | 9/2002 |
| EP | 2 308 719 A1 | 4/2011 |

(Continued)

*Primary Examiner* — Stephen T Gordon
(74) *Attorney, Agent, or Firm* — MCCRACKEN & GILLEN LLC

(57) ABSTRACT

A container retention device comprises a housing and an actuator having a first portion disposed in the housing and a second portion movable between a first position inside the housing to a second position outside the housing. The device further comprises a first link assembly in the housing engageable by the first portion of the actuator and movable in response to movement of the second portion between the first and second positions. Also, a second link assembly is disposed in the housing having a third portion engageable by the first link, a fourth portion, and a fifth portion disposed between the third portion and the fourth portion wherein the third portion and the fourth portion are rotatable about the fifth portion in response to movement of the first link assembly. A locking member is extendable outside the housing in response to movement of the second portion to the first position. A container retention method is also disclosed.

20 Claims, 17 Drawing Sheets

(56) References Cited

U.S. PATENT DOCUMENTS

| | | |
|---|---|---|
| 4,212,251 A | 7/1980 | DiMartino |
| 4,236,858 A | 12/1980 | Hoese et al. |
| 4,266,820 A | 5/1981 | Whaley et al. |
| 4,382,734 A | 5/1983 | Synowiec et al. |
| 4,437,211 A | 3/1984 | Dorpmund |
| 5,106,247 A | 4/1992 | Hove et al. |
| 5,120,243 A | 6/1992 | Mee |
| 5,465,990 A | 11/1995 | Wessels |
| 5,564,725 A | 10/1996 | Brazeal |
| 5,573,360 A | 11/1996 | Bennett |
| 5,575,599 A | 11/1996 | Conlee et al. |
| 5,758,890 A | 6/1998 | Wessels |
| 5,829,946 A | 11/1998 | McNeilus et al. |
| 5,839,864 A | 11/1998 | Reynard |
| 5,848,869 A | 12/1998 | Slocum et al. |
| 6,409,192 B1 | 6/2002 | Botts |
| 6,565,299 B1 | 5/2003 | Guilbault et al. |
| 6,692,203 B2 | 2/2004 | Kim et al. |
| 7,240,936 B2 | 7/2007 | Petzitillo, Jr. et al. |
| 7,484,918 B2 | 2/2009 | Brewster |
| 7,984,941 B2 | 7/2011 | Lorenzo et al. |
| 8,348,564 B2 | 1/2013 | Fukui |
| 9,340,146 B2 | 5/2016 | Lanigan, Sr. et al. |
| 9,387,792 B2 | 7/2016 | Lanigan, Sr. et al. |
| 9,463,732 B2 | 10/2016 | Lanigan, Sr. et al. |
| 9,802,526 B2 | 10/2017 | Lanigan, Sr. et al. |
| 2007/0292228 A1* | 12/2007 | Watson ............... B60P 7/132 410/82 |
| 2008/0014040 A1 | 1/2008 | Ding |
| 2010/0303573 A1 | 12/2010 | Brewster |
| 2013/0121783 A1* | 5/2013 | Kelly .................. B60P 7/13 410/84 |

FOREIGN PATENT DOCUMENTS

| | | |
|---|---|---|
| WO | WO 2008/095605 A1 | 8/2008 |
| WO | WO 2011/066829 A1 | 6/2011 |

* cited by examiner

LATCHING DEVICE AND METHOD FOR AUTOMATIC SECUREMENT OF A CONTAINER TO A CONTAINER CHASSIS

CROSS REFERENCE TO RELATED APPLICATIONS

This patent application incorporates by reference co-owned U.S. Pat. Nos. 9,387,792, 9,463,732, and 9,802,526, each entitled "Latching System for Automatic Securement of a Container to a Container Chassis" by John J. Lanigan, Sr., et al., co-owned U.S. Pat. No. 9,340,146, entitled "Front Pin Latching System for Automatic Securement of a Container to a Container Chassis" by John J. Lanigan, Sr., et al., and co-owned U.S. patent application Ser. No. 17/141,967, entitled "Systems and Method for Securement of a Container to a Vehicle Having a Brake System" by James T. Russo.

REFERENCE REGARDING FEDERALLY SPONSORED RESEARCH OR DEVELOPMENT

Not applicable.

SEQUENTIAL LISTING

Not applicable.

BACKGROUND OF THE DISCLOSURE

1. Field of the Disclosure

The present subject matter relates generally to latching devices, and more particularly, to container latches for a container chassis.

2. Description of the Background of the Disclosure

In a conventional container chassis used for transporting a container, the container is secured to the container chassis by two latches spaced apart at each of the two front corners and two latches spaced apart at each of the two rear corners of the container chassis. In one design these latches are manually operated by the driver or other personnel. The rear latches may have a twist lock that is inserted into the bottom of the corner castings of a container. The twist lock may be operated by a lever to move the twist lock between an unlatched position and a latched position. The front latches of a conventional chassis that is 40 to 53 feet in length may have locking pins that extend horizontally into openings of the corner castings of the container. The front of a conventional chassis that is 20 feet in length may utilize a twist lock and manual lever rather than the locking pins.

Such conventional latching devices are manually operated by the chassis driver or other personnel when a container is placed on a chassis. Subsequently, the conventional latching devices are manually unlocked before the container is removed from the chassis. In this regard, the driver or other personnel may improperly or incompletely lock or unlock the latching devices, which may cause improper loading/unloading of the container to/from the chassis and/or create the potential for shifting of or losing a container during road transport.

In the railway transportation industry, a container is typically secured to the four corners of a railcar using a swing-type latch. Two swing-type latches spaced apart at each of the two front corners and two swing-type latches spaced apart at each of the two rear corners of the railcar secure the container thereto. Similar to the twist lock latch of a container chassis, the swing-type latches of the railcar enter openings along the bottom surface of each corner casting of the container. Unlike the twist lock latch, the swing-type latch is continuously biased into position by a spring. As the container is placed on the railcar, the latch is pushed back against the spring until the latch clears the bottom surface of the corner casting. The latch is designed such that a significant force must be applied against the latch to remove the container from the railcar. A container weight of approximately 700 lbs. may be required to load the container onto the railcar, and a force of approximately 2,000 lbs., for example, may be necessary to remove the container from the railcar.

Co-owned U.S. Pat. No. 9,340,146 incorporated by reference herein discloses a front pin latching system for automatic securement of a container to a container chassis. The front pin latching system includes a shelf configured to move vertically on an outer surface of the container chassis. The shelf and the container chassis have adjacent openings. The system also includes a pin configured to move horizontally through the adjacent openings and a linkage mechanism disposed on an inner surface of the container chassis. The linkage mechanism is operably coupled to the shelf and the pin. Placement of the container on the container chassis moves the shelf causing the linkage mechanism to move the pin such that the pin automatically secures the container to the container chassis.

Co-owned U.S. Pat. No. 9,387,792 incorporated by reference herein discloses a latching system for automatic securement of a container to a container chassis. The latching system includes an actuation device disposed on an upper surface of the container chassis, a linkage mechanism disposed below the upper surface, and a connector positioned on a further surface elevated above the upper surface. Placement of the container on the container chassis actuates the actuation device causing the linkage mechanism to move the connector and automatically secure the container to the container chassis.

Co-owned U.S. Pat. No. 9,463,732 incorporated by reference herein discloses a latching system for automatic securement of a container to a container chassis. The latching system includes an actuation device that extends through a surface of the container chassis, a linkage mechanism disposed below the surface, and a latch coupled to a pivot. The latch is positioned above the surface of the container chassis. Placement of the container on the container chassis actuates the actuation device causing the linkage mechanism to move the latch such that the latch automatically secures the container to the container chassis.

SUMMARY

According to one aspect, a container retention device comprises a housing and an actuator having a first portion disposed in the housing and a second portion movable between a first position inside the housing to a second position outside the housing. The device further comprises a first link assembly in the housing engageable by the first portion of the actuator and movable in response to movement of the second portion between the first and second positions. Also, a second link assembly is disposed in the housing having a third portion engageable by the first link, a fourth portion, and a fifth portion disposed between the third portion and the fourth portion wherein the third portion and the fourth portion are rotatable about the fifth portion in response to movement of the first link assembly. A locking member is extendable outside the housing in response to movement of the second portion to the first position.

According to another aspect a container retention device comprises a housing and an actuator having a first portion disposed in the housing and a second portion movable between a first position inside the housing to a second position outside the housing. The device further comprises a first link assembly in the housing engageable by the first portion of the actuator and movable in response to movement of the second portion between the first and second positions. A second link assembly is disposed in the housing having a third portion engageable by the first link, a fourth portion, and a fifth portion disposed between the third portion and the fourth portion wherein the fifth portion is pivotably coupled to an anchor plate that is stationary with respect to the housing and the third portion and the fourth portion are rotatable about the fifth portion in response to movement of the first link assembly. The device still further comprises a latch having a locking member movable to a position outside the housing in response to movement of the second portion to the first position and the second link assembly comprises a slot defined by walls engaged by a bearing set coupled to the latch. A shaft is carried by the latch and a further set of bearings is mounted on the shaft wherein the further set of bearings engages a racetrack-shaped surface of a member secured to the housing.

According to yet another aspect, a container retention method comprises the steps of disposing an actuator having a first portion in the housing and a second portion movable between a first position inside the housing to a second position outside the housing and disposing a first link assembly in the housing engageable by the first portion of the actuator and movable in response to movement of the second portion between the first and second positions. Further, a second link assembly is disposed in the housing having a third portion engageable by the first link, a fourth portion, and a fifth portion disposed between the third portion and the fourth portion wherein the third portion and the fourth portion are rotatable about the fifth portion in response to movement of the first link assembly. Also, a locking member is provided that is extendable from a third position inside the housing to a fourth position outside the housing in response to movement of the fourth portion. The method further comprises the step of moving a container into contact with the second portion of the actuator while the second portion is disposed at the second position and the locking member is disposed at the third position to move the second portion toward the first position such that the first link assembly rotates the second link assembly about the fifth portion and the fourth portion moves the locking member to the fourth position.

Other aspects and advantages will become apparent upon consideration of the following detailed description and the attached drawings wherein like numerals designate like structures throughout the specification.

DETAILED DESCRIPTION

Figure 1:
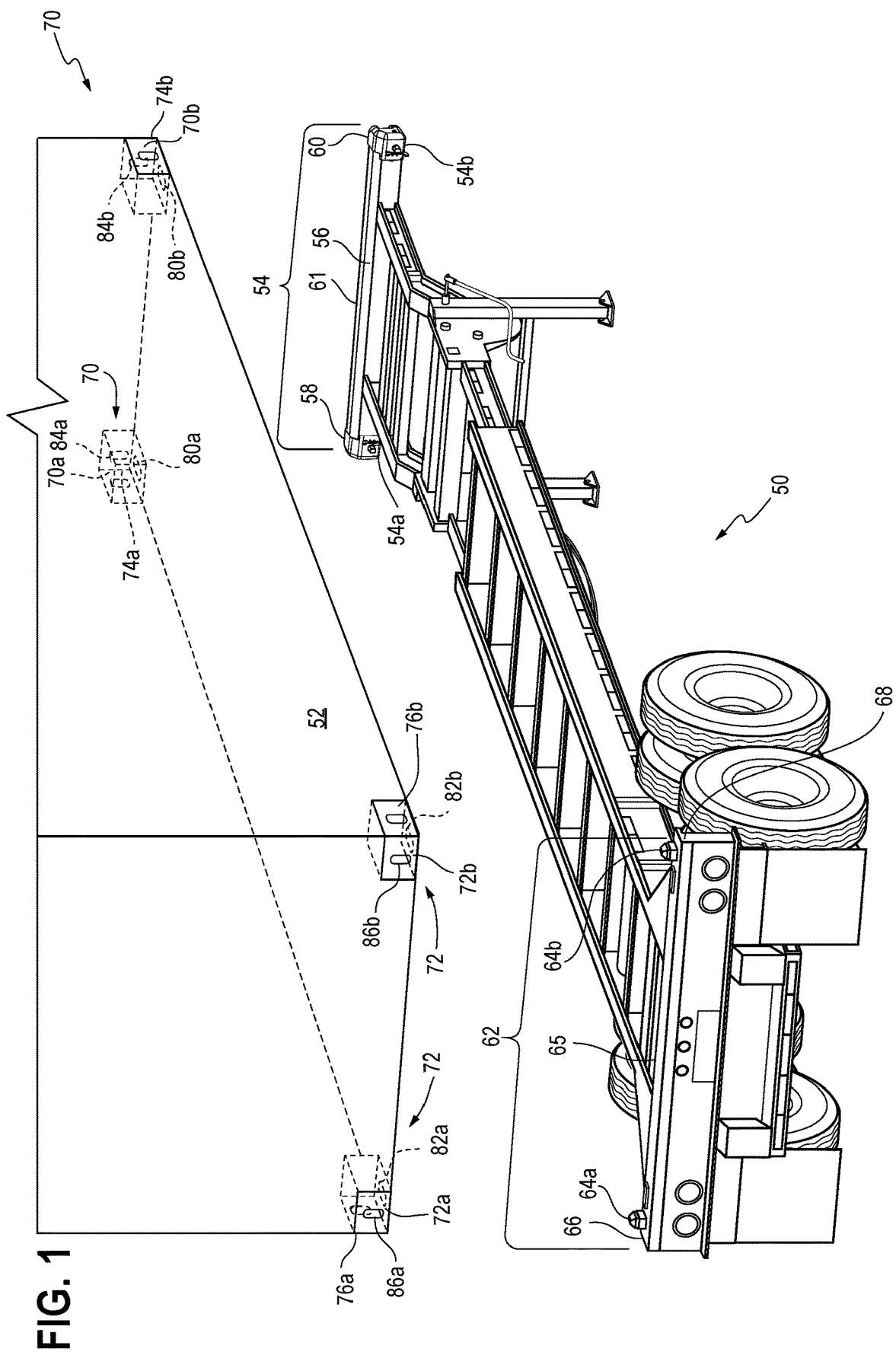
FIG. 1 is an isometric view of a container chassis incorporating container retention devices operative to secure a container thereto.

Various latching devices for use with a container chassis are described herein. As seen, such devices allow for the automatic latching and unlatching of an empty, filled, or partially filled container to and from a container chassis. In the drawings, like reference numerals connote like structures throughout.

Figure 2:
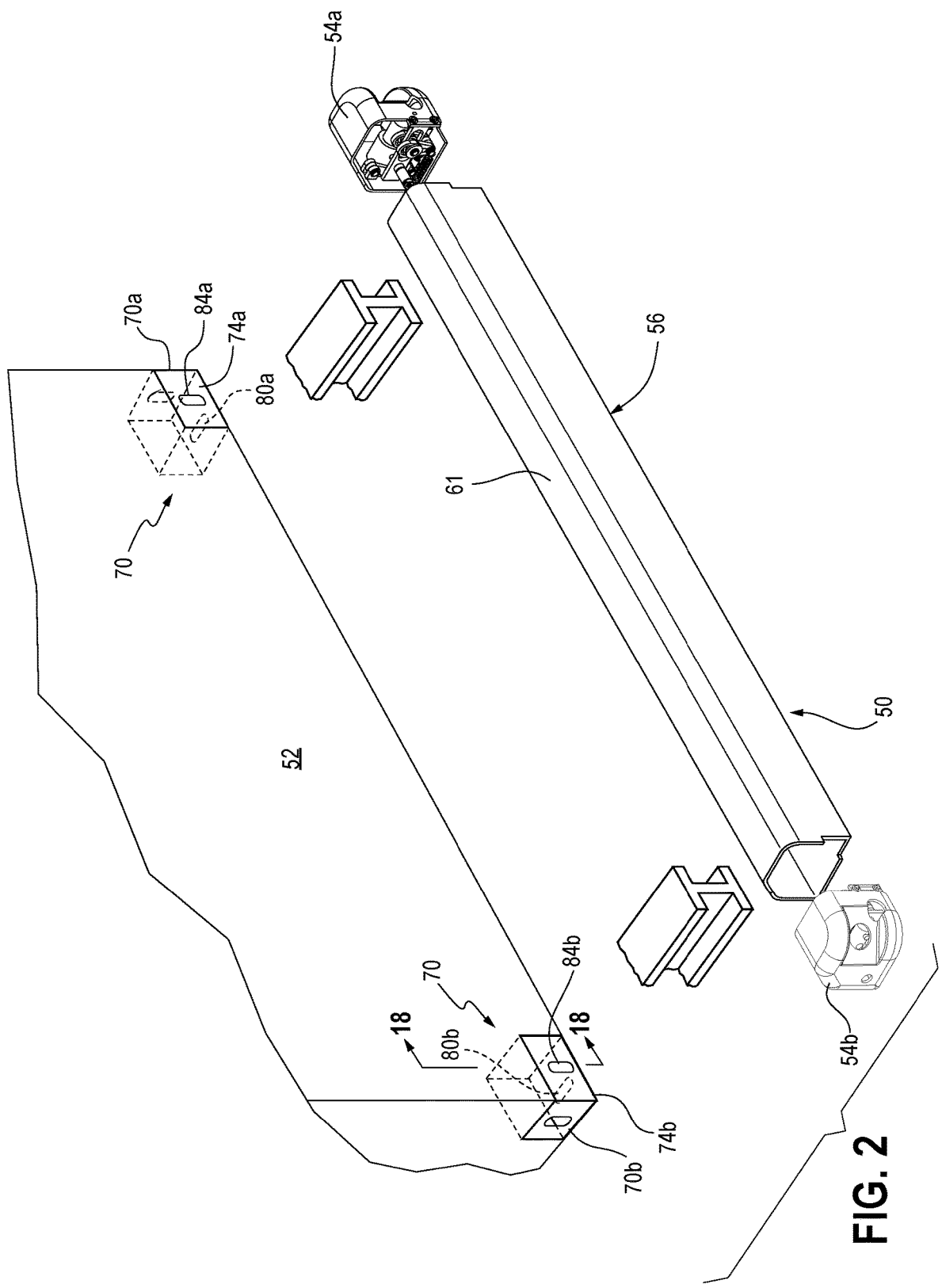
FIGS. 2 and 3 are exploded, fragmentary, isometric front and rear views, respectively, of the front container retention devices of FIG. 1 and the container.
Figure 3:
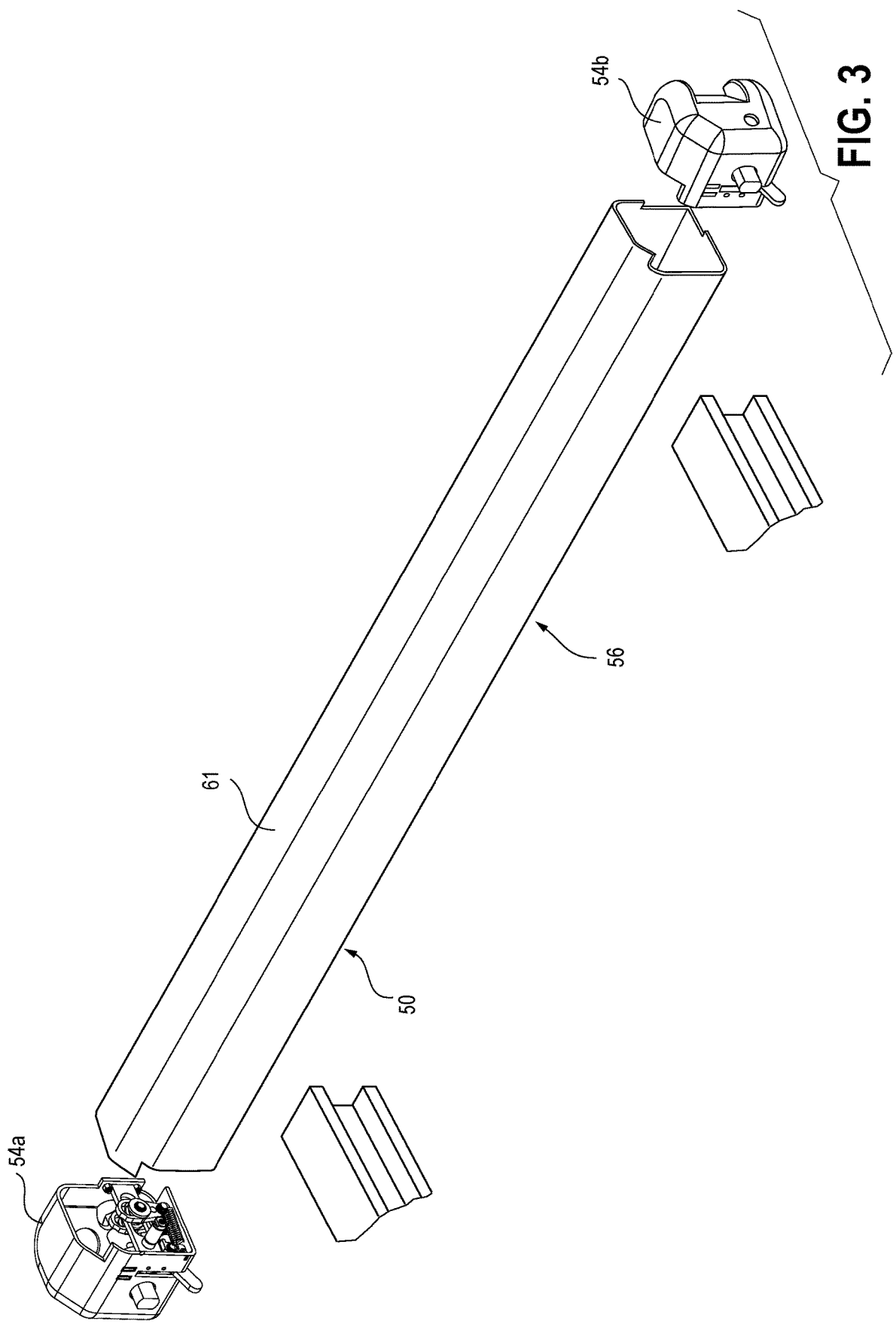

Referring to FIGS. 1-3, a container chassis 50 includes container latching devices to secure a container 52 thereto. More particularly, a pair of front latching structures 54 comprising spaced first or driver side and second or passenger side front container retention devices 54a, 54b, respectively, is disposed at a front portion 56 of the chassis 50, preferably at or adjacent associated front corners 58, 60 of the chassis 50. Particularly, in the illustrated embodiment, the devices 54a 54b are integral with or secured (such as by welds) to outboard ends of a transverse head beam 61 of the chassis 50. Alternatively, the devices 54a, 54b may be integrated within the outboard ends of a transverse head beam 61 of the chassis 50. A pair of rear latching structures 62 (FIG. 1) comprising spaced first or driver side and second or passenger side rear container retention devices 64a, 64b, respectively, is provided on a rear portion 65 of the chassis 50, preferably at or adjacent associated rear corners 66, 68 of the chassis 50. As seen in FIGS. 1 and 2, the container 52 includes front and rear pairs of castings 70, 72, respectively, wherein the front pair 70 comprises a first or driver side front casting 70a and a second or passenger side front casting 70b. The rear pair 72 comprises a first or driver side rear casting 72a and a second or passenger side rear casting 72b. The castings 70a, 70b, 72a, 72b are preferably disposed at or adjacent front and rear corners 74a, 74b, 76a, 76b, respectively, of the container 52.

Each of the castings 70a, 70b, 72a, 72b may include a first or bottom opening 80a, 80b, 82a, 82b, respectively. In addition, each of the castings 70a, 70b may include forward-facing openings 84a, 84b while each of the castings 72a, 72b may include rearwardly-facing openings 86a, 86b, respectively. Each of the castings 70, 72 may include a lesser or greater number of openings, for example, openings may be provided on side surfaces thereof or the front castings 70a, 70b may include only the forward facing openings 84a, 84b, respectively. In any event, each casting 70, 72 has at least a necessary number of properly-positioned openings such that, when the container 52 is disposed on the chassis 50, one or more portions of the container retention devices 54a, 54b, 64a, 64b extend into one or more of the casting openings 80, 82, 84, and/or 86 to allow securement of the container 52 to the chassis 50 as described hereinafter.

The container chassis 50 shown in the embodiment in FIG. 1 may have a length of 40 to 53 feet, for example. Differently-sized containers may be accommodated on the chassis 50 by providing a greater number of container latching devices and/or castings as required to secure the container 52 in a stable fashion. Still further, a container chassis having a length of 20 feet (not shown) may alternatively utilize the latching arrangements described herein in the rear and/or front portions of the container chassis.

In the embodiment shown in FIGS. 1-3, the front container retention devices 54a, 54b are mirror images of one another, but are preferably otherwise identical, and hence, only the driver side retention device 54a will be described in detail herein.

Figure 4:
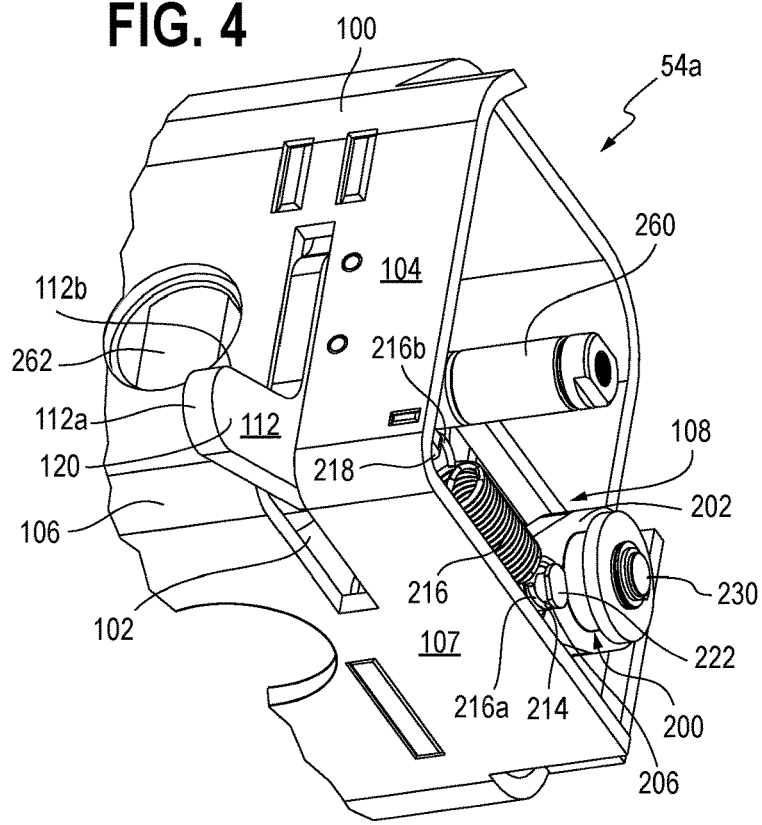
FIGS. 4-6 are bottom rear, top front, and top side fragmentary isometric views, respectively, of one of the container retention devices of FIG. 2 shown in an unlatched state.
Figure 5:
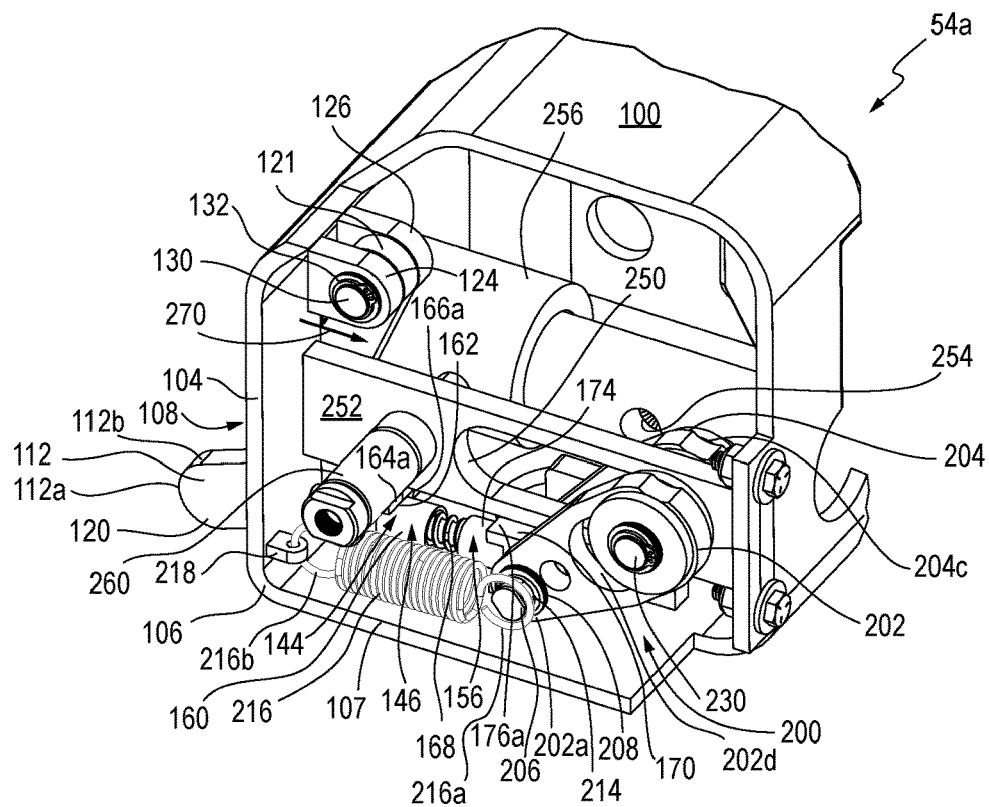
Figure 6:
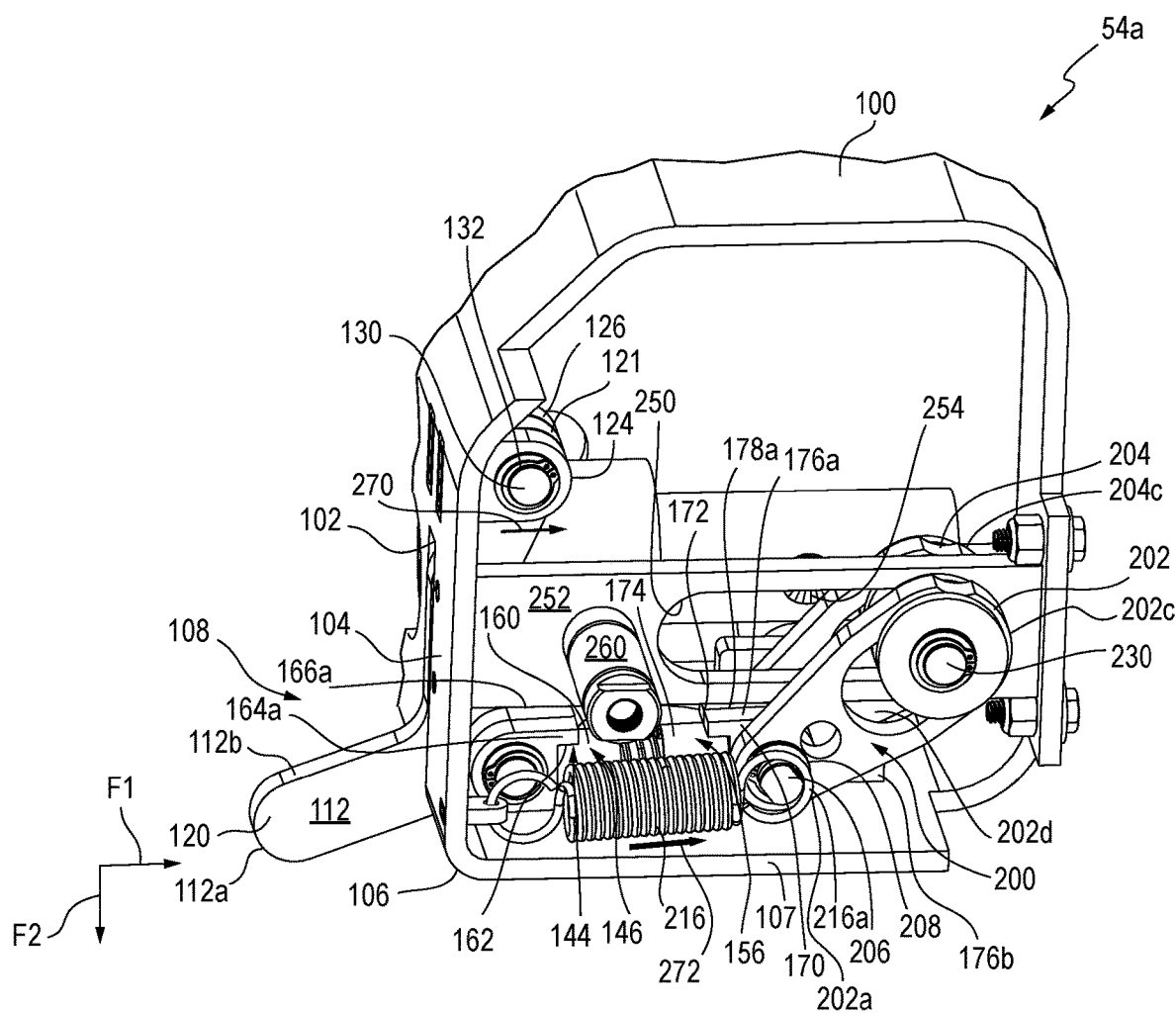

Referring next to FIGS. 4-6, the retention device 54a includes a housing 100 having an elongate slot 102 that extends fully through the housing 100 and further extends linearly from a first wall 104 through a corner 106 to a second wall 107 of the housing 100. The housing 100 encloses a retention mechanism 108 therein.

Figure 12:
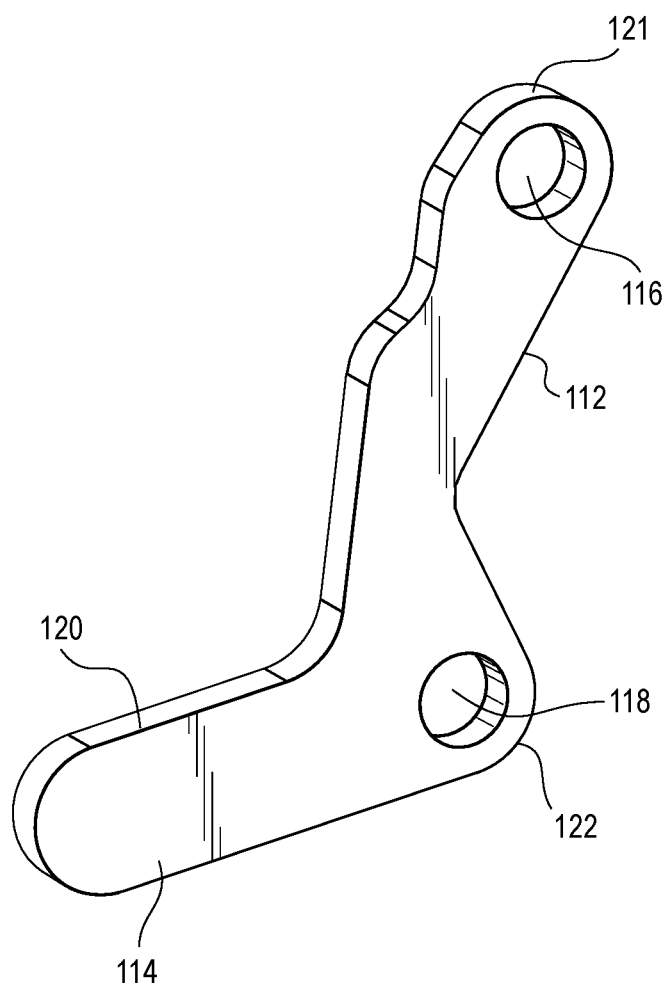
FIG. 12 is an isometric view of the actuator of FIGS. 4-6.
Figure 13:
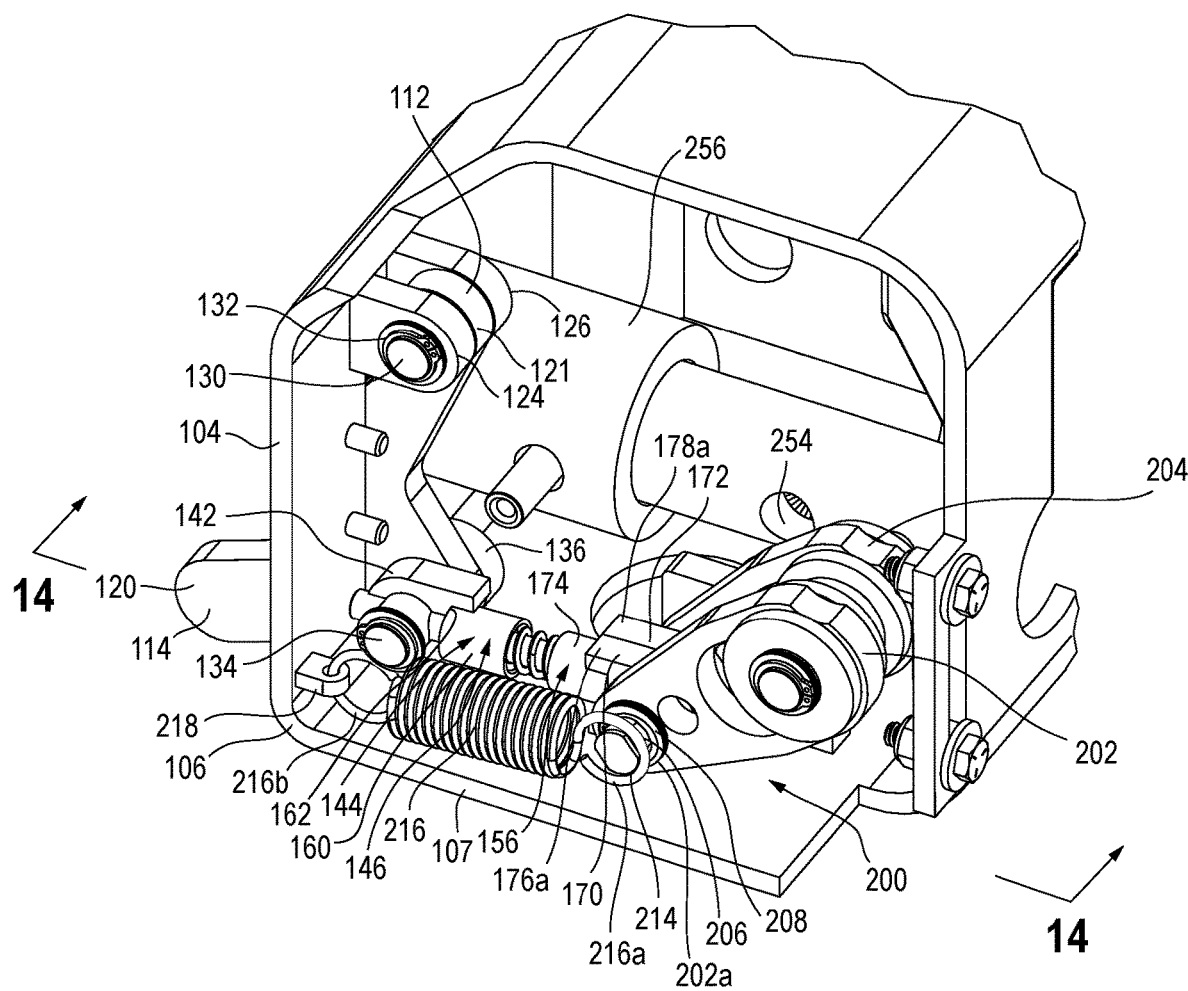
FIG. 13 is a fragmentary isometric view of the container retention device of FIGS. 4-8 with portions removed therefrom to reveal interior components.

The retention mechanism 108 comprises an actuator 120 (seen in detail in FIG. 12) having an approximate L-shape including first and second legs 112, 114, respectively, and first and second openings 116, 118 disposed at an end portion 121 and a heel portion 122, respectively. As best seen in FIGS. 5 and 6, the end portion 121 is disposed between a clevis formed by pair of aligned anchors 124, 126 and is rotatably secured therebetween by a pin 130 and snap or lock ring 132. Referring also to FIGS. 13-17, the second opening 118 (best seen in FIG. 15) receives a pin 134 and a spacer 136 bears against the heel portion 122. The pin 134 extends through aligned cross-openings 138, 139 in first and second link halves 140, 142, respectively, (all best seen in FIGS. 14 and 15) wherein the link halves together define a first portion 144 of a first link assembly 146 (FIGS. 5 and 6) (the link half 140 and other structures are omitted in FIG. 13 to illustrate the internal structures of the portion 144). Opposed snap or lock rings 147a, 147b disposed on ends of the pin 134 rotatably secure the link halves 140, 142 to the spacer 136 and the heel portion 122. A proximal end 148 of a longitudinal cylindrical shaft 149 (FIGS. 14 and 15) is slidably disposed in a cross bore 150 extending through the shaft 137 and extends toward a second portion 156 of the first link assembly 146.

A first tube 160 is disposed in a recess 162 (FIGS. 5, 6, 13, and 14) defined by upper flanges 164a 166a and lower flanges 164b, 166b (FIG. 15) of the link halves 140, 142. The first tube 160 is retained in the recess 162 in any suitable fashion, such as by being captured between the flanges 164 and 166. In a preferred embodiment, the first tube 160 is welded to the flanges 164 and 166. Also, in alternative embodiments, the flanges 164 and 166 are either a single, integral flange, or are welded together and/or together may partially or fully encircle the first tube 160. A first end 167 (FIGS. 14 and 15) of a spring 168 is received in the first tube 160 and surrounds the shaft 149.

The second portion 156 of the first link 146 is substantially a mirror image of the first portion 144 and includes first and second link halves 170, 172 that define the second portion 156 and a second tube 174 disposed and retained in any suitable fashion (such as noted above with respect to the first tube 160) between upper flanges 176a, 178a and lower flanges 176b and 178b of the link halves 170, 172, wherein a second end 180 (FIGS. 14 and 15) of the spring 168 is disposed in the second tube 174 and may be compressed between end surfaces of the tubes 160, 174. Unlike the first portion 144, a distal end 182 of the shaft 149 is immovably secured and retained in a bore 184 defined between the link halves 170, 172.

A second link assembly 200 includes spaced second link assembly arms 202, 204 that are secured together at lower ends 202a, 204a thereof by a pin 206 with a distal end 212 of the second portion 156 of the first link 146 being disposed between and rotatable with respect to the second link assembly arms 202, 204. In the illustrated embodiment the pin 206 is press fitted and welded to assembly arm 204. A snap or lock ring 208 secures the arms 202, 204 together at a proximal end of the pin 206, wherein the pin 206 includes a groove 214 proximate the assembly arm 202. A return spring 216 includes a first end 216a that is wrapped over the pin 206 inside the groove 214 and a second end 216b of the spring 216 is secured to an anchor tab 218 integral with or secured to the housing 100. In an alternate embodiment, the assembly arm 202 may be omitted and the pin 206 is press fitted and/or welded to the assembly arm 204. As in the previous embodiment, the first end 216a of the return spring 216 is wrapped over the pin 206 inside the groove 214 and a second end 216b of the spring 216 is secured to the anchor tab 218. A distal end 212 of the second portion 156 of the first link is rotatable with respect to the second link assembly arm 204.

Figure 14:
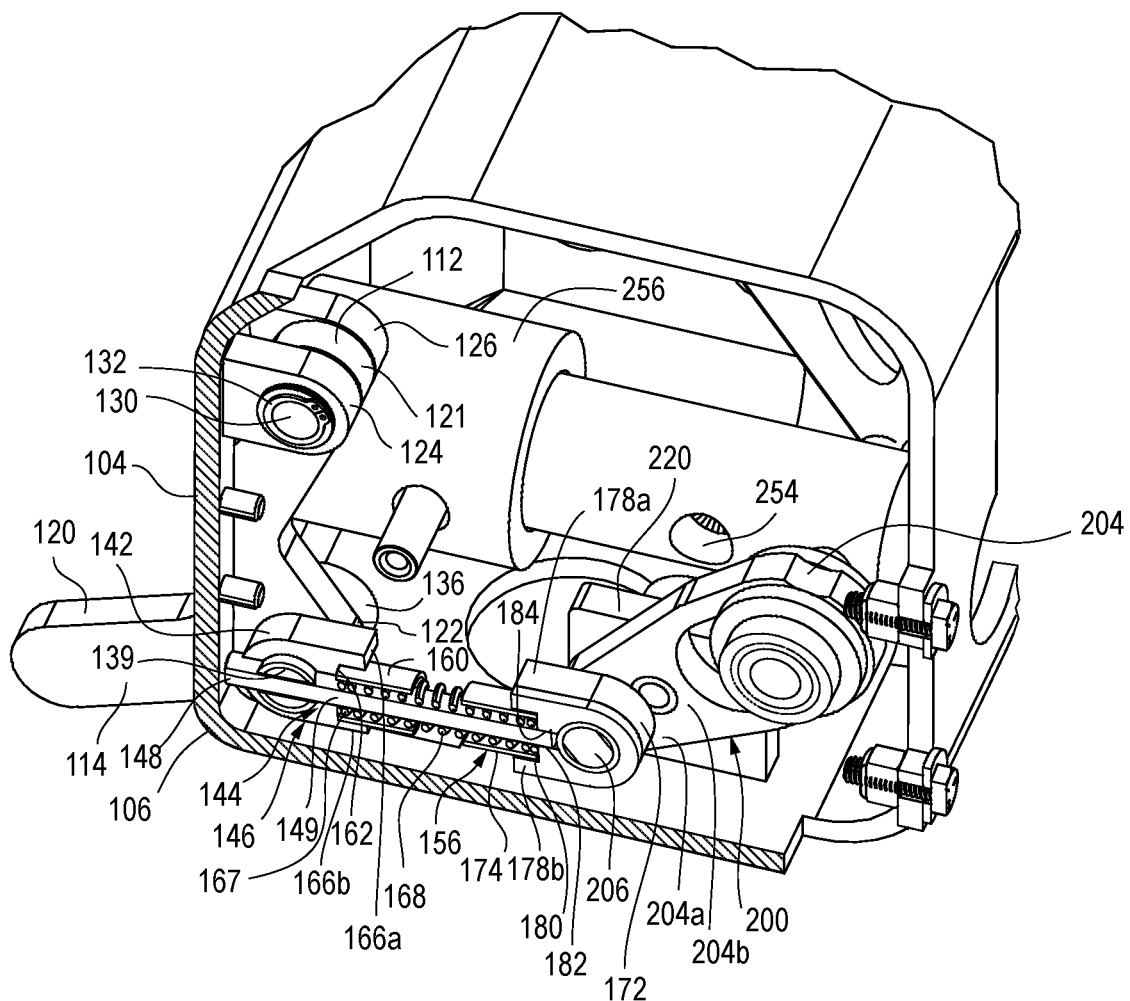
FIG. 14 is a sectional view taken generally along the lines 14-14 of FIG. 13.
Figure 15:
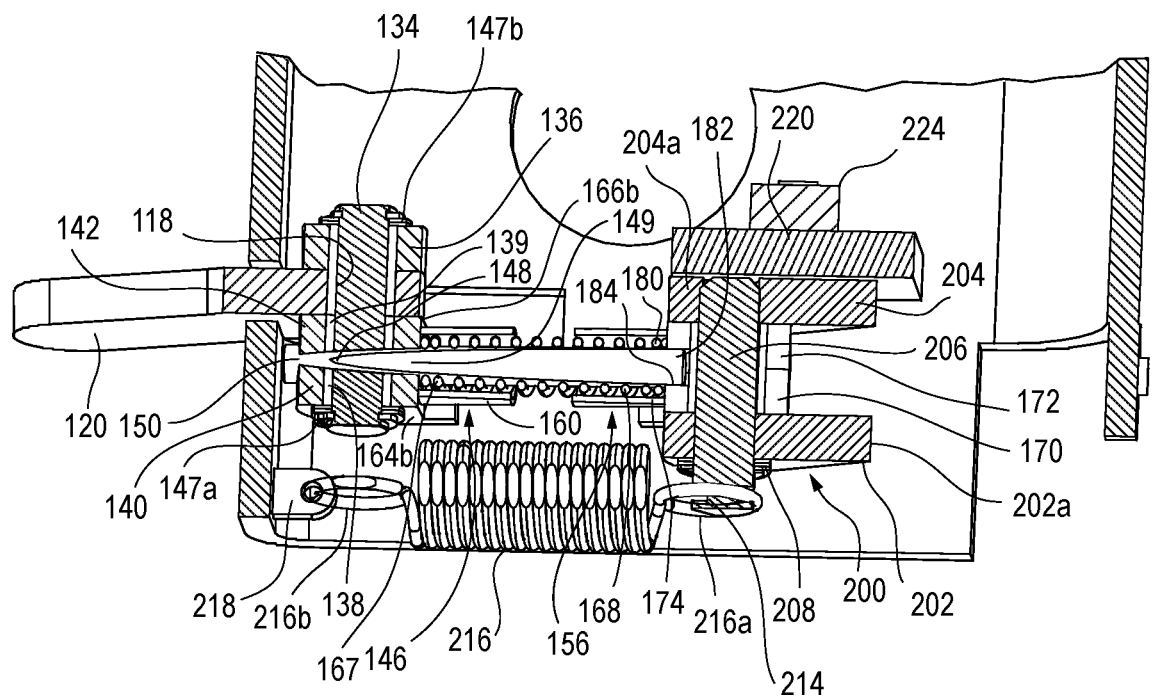
FIG. 15 is a fragmentary sectional view taken generally along the lines 15-15 of FIG. 7 before movement toward the latching position.
Figure 16:
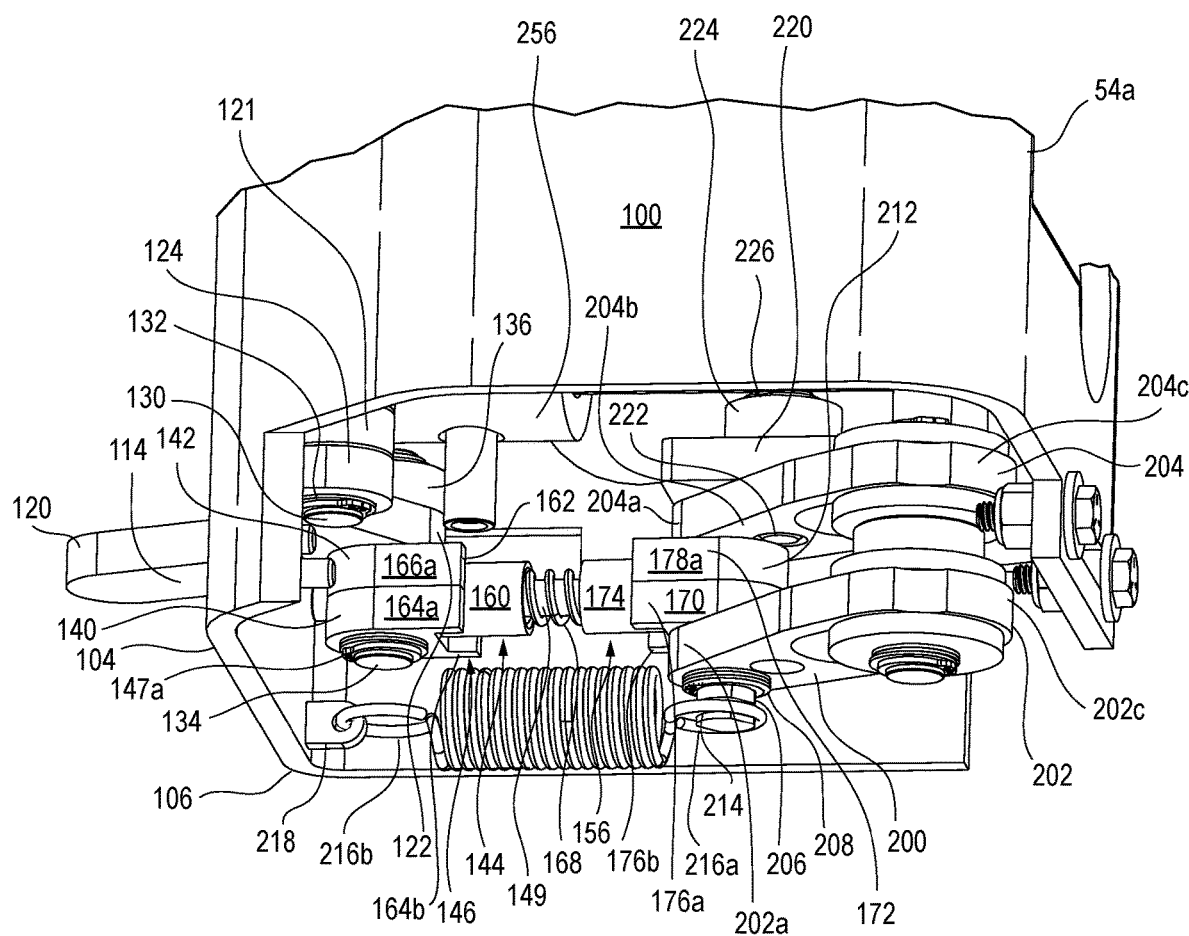
FIG. 16 is a fragmentary isometric view of the container retention device of FIGS. 4-8 with portions removed therefrom to reveal interior components.
Figure 17:
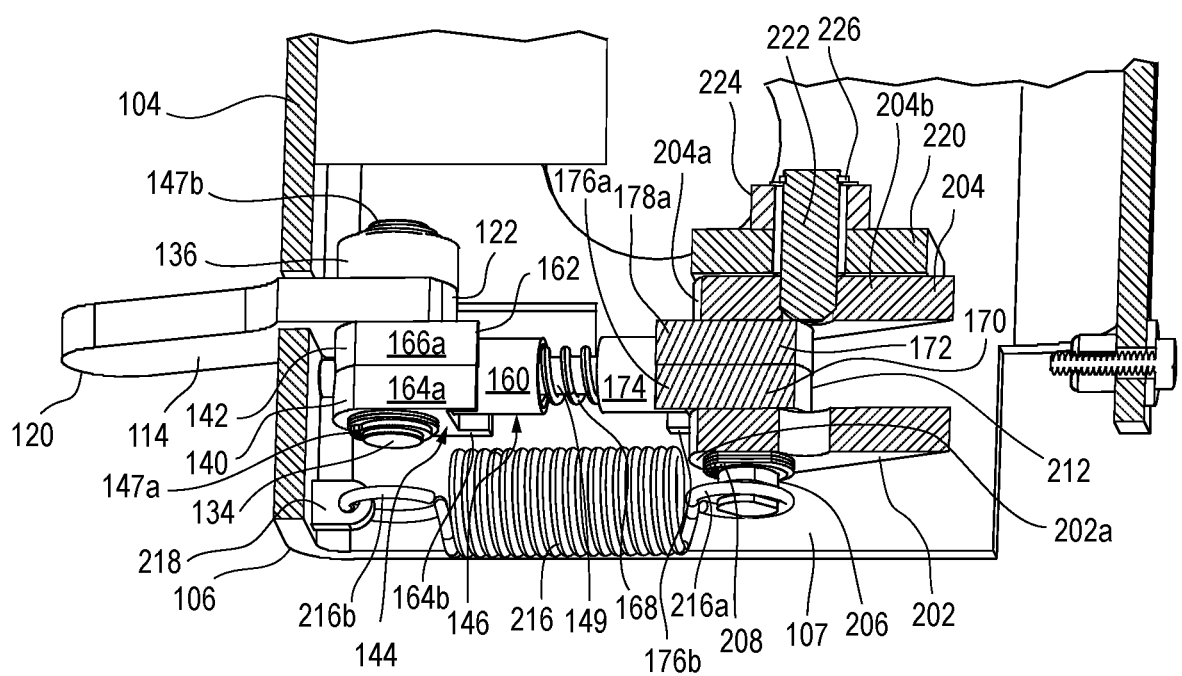
FIG. 17 is a fragmentary sectional view taken generally along the lines 17-17 of FIG. 7 before movement toward the latching position.

As seen in FIGS. 14, 16, and 17, a mid-portion 204b of the link assembly arm 204 is rotatably secured to an anchor plate 220 by a pin 222, a spacer 224, and a snap or lock ring 226. The anchor plate 220 may be integral with or secured to the housing 100 and is stationary with respect to the housing 100. Similar to the pin 206, a proximal end of pin 222 is press fitted within and welded to assembly arm 204, and a distal end of the pin 222 passes through the anchor plate 220 and the spacer 224 and is secured by a snap or lock ring 226.

Figure 9:
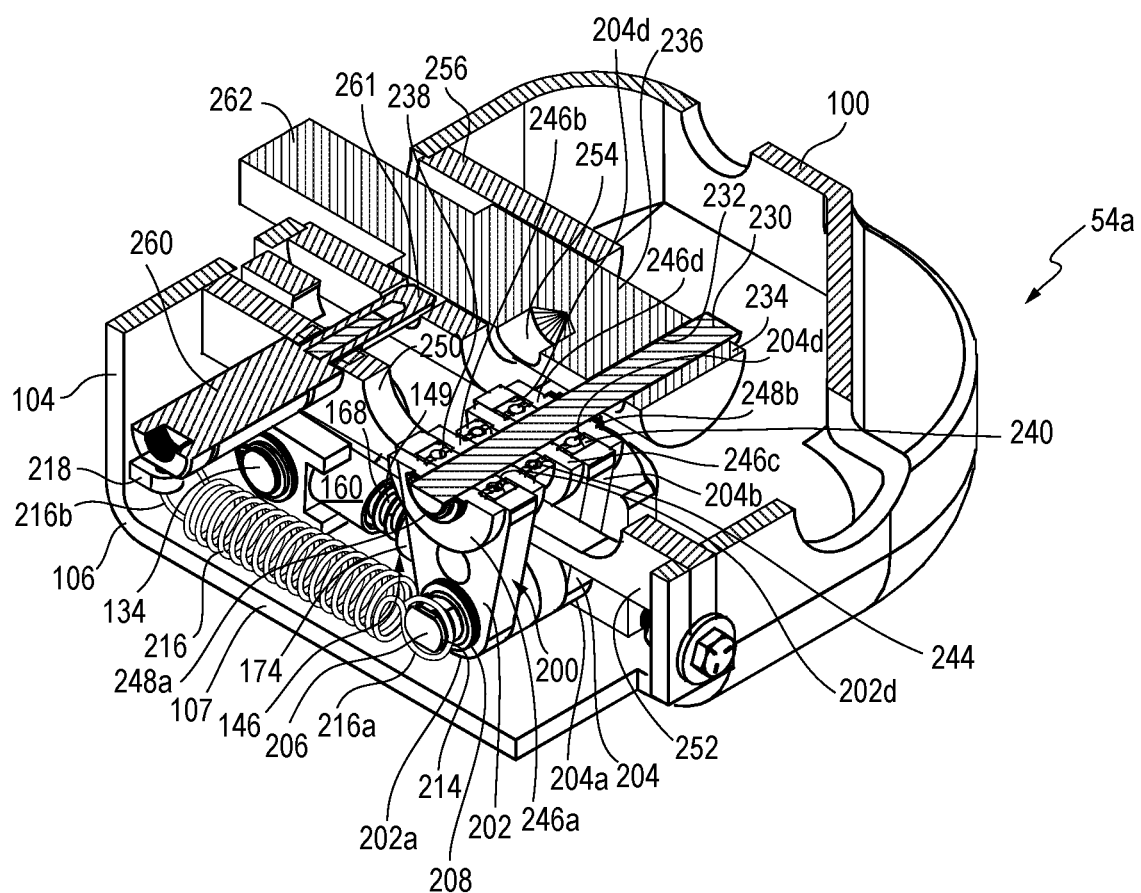
FIGS. 9 and 10 are combined isometric sectional and elevational sectional views taken generally along the lines 9-9 of FIG. 7.
Figure 10:
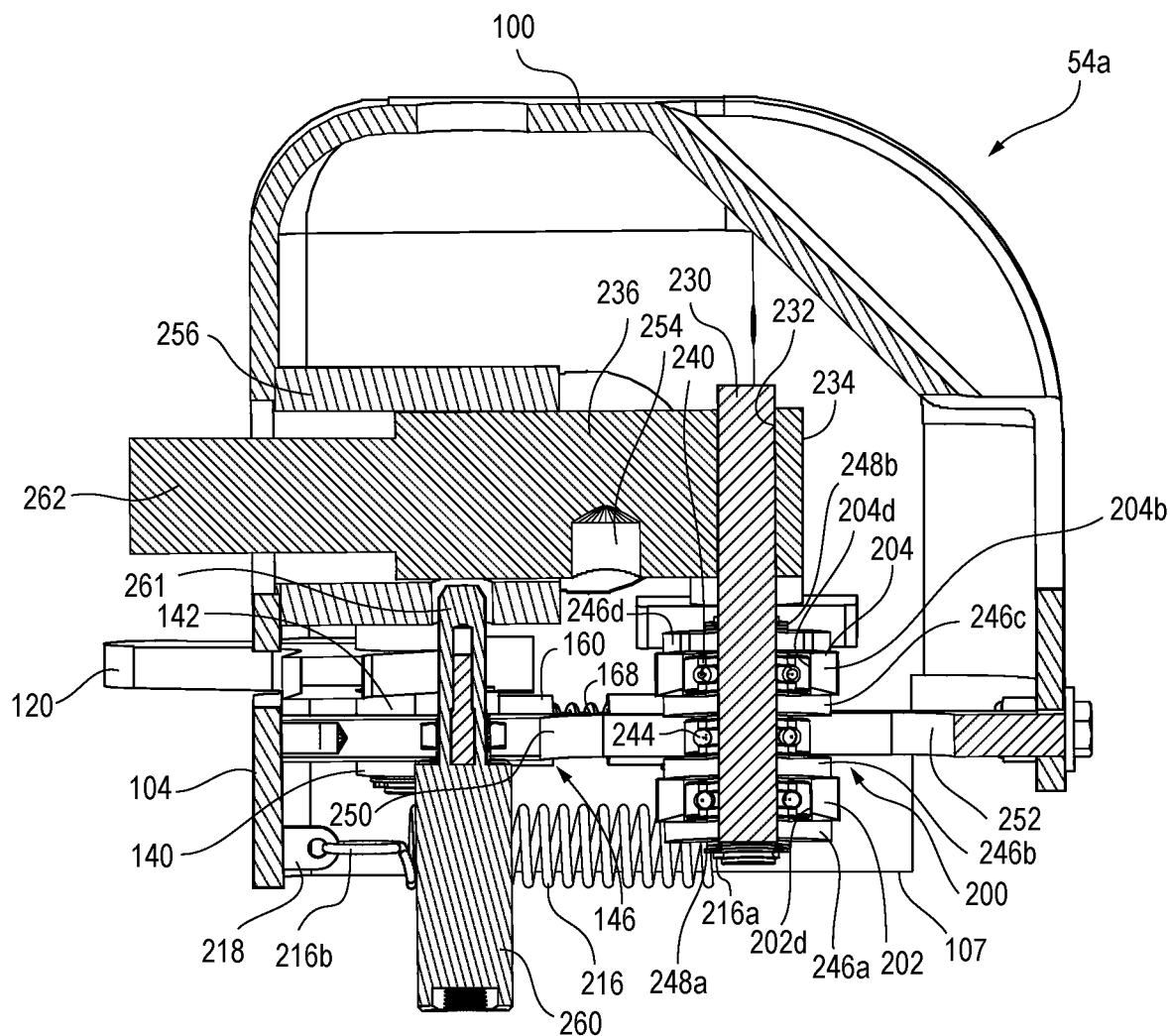

Referring again to FIGS. 5 and 6 (which illustrate the container retention device in an unlatched state) and FIGS. 9 and 10 (which illustrate the container retention device in the process of moving toward a fully latched state), each of upper ends 202c, 204c of the second link assembly arms 202, 204 includes elongate slots 202d, 204d that receive an elongate circular cylindrical shaft 230 that is immovably mounted in a bore 232 FIG. 9) disposed near a first end 234 of a latch 236. First and second bearings sets 238 and 240 are disposed between an outer surface 242 of the shaft 230 and inner surfaces that define the slots 202d, 204d, respectively. The bearings 238 and 240 as well as a further or third set of bearings 244 are held at spaced axial locations on the shaft 230 by spacers 246a-246d and snap or lock rings 248a, 248b. The third set of bearings 244 includes an outer race that contacts and rides on and/or along a racetrack-shaped surface 250 defining a slot of a longitudinal member 252 mounted to opposite front and rear sides of the housing 100.

The latch 236 includes a bore 254 (FIGS. 5, 6, 9, 10, 13, and 14), that may extend partially or fully through the latch 236. A selectively controllable actuation mechanism 260, (FIGS. 4-6, 9, and 10) which may be a hydraulic piston and cylinder device, a solenoid, or another controllable motive power device, includes an actuator plunger 261 (FIGS. 9 and 10) that is movable into and retractable from the bore 254, as noted in greater detail below. The latch 236 further includes a locking member 262 (FIGS. 4, 9, and 10) that may be integral with the balance of the latch or may be secured thereto. The latch 236 and/or locking member 262 extend through a cylindrical collar 256 (FIGS. 9 and 10 as well as other FIGS.) that is joined to or integral with the housing 100 and that provides support for the latch and/or locking member 262.

In operation, before a container 52 is placed on the chassis 50, the various elements of the container retention device 54a are in the positions shown in FIGS. 4-6 and 13-17. Thus, the actuator 120 is disposed in a fully extended position outside of the housing 100. In this state, the return spring 216 exerts a restraining force on the second link assembly 200, which causes the second link assembly 200 to be positioned at an extreme clockwise position (as seen in FIG. 6) about the shaft 230. Such positioning causes the latch 236, and thus the locking member 262, to assume a fully retracted position within the housing.

As seen in FIGS. 1-6, as a container 52 is lowered and/or brought from the rear toward the container retention device 54a, a lower surface or front surface of the container 52 contacts an end surface 112a or a top surface 112b of the leg 112 of the actuator 120, thereby exerting a force on the actuator 120 having a component in a directional range at or between approximate directions represented by force vectors F1 and F2 shown in FIG. 6. Continued advancement of the container 52 in such manner causes the actuator 120 to pivot downwardly and inwardly relative to the housing 100 in the direction of an arrow 270 (FIGS. 5 and 6) about the pin 130. The shape of the actuator 120 and the rotatable connection of the actuator 120 with the first portion 144 via the pin 134 results in translation of the first portion 144 along a path shown by the arrow 272 of FIG. 6 that is substantially parallel to a path traversed by the actuator 120.

Movement of the first portion 144 along the path illustrated by the arrow 272 causes forces to be transferred to the second portion 156 of the first link assembly 146. In this regard, the spring 168 is sufficiently stiff to transmit forces effectively to the second portion 156 to move the latter in the direction of the arrow 272 when the latch 236 and locking member 262 are free to extend. On the other hand, the spring 168 is sufficiently compliant to compress and take up motion and limit forces transmitted to the second portion 156 when the latch 236 and locking member 262 are unable to move in the extension direction as a result of, for example, misalignment of the locking member 262 relative to the front opening 84a of the casting 72a resulting in blocking of the locking member 262. In this regard, the longitudinal shaft 149 prevents the spring 168 from winding up on itself when the latter is compressed.

Figure 7:
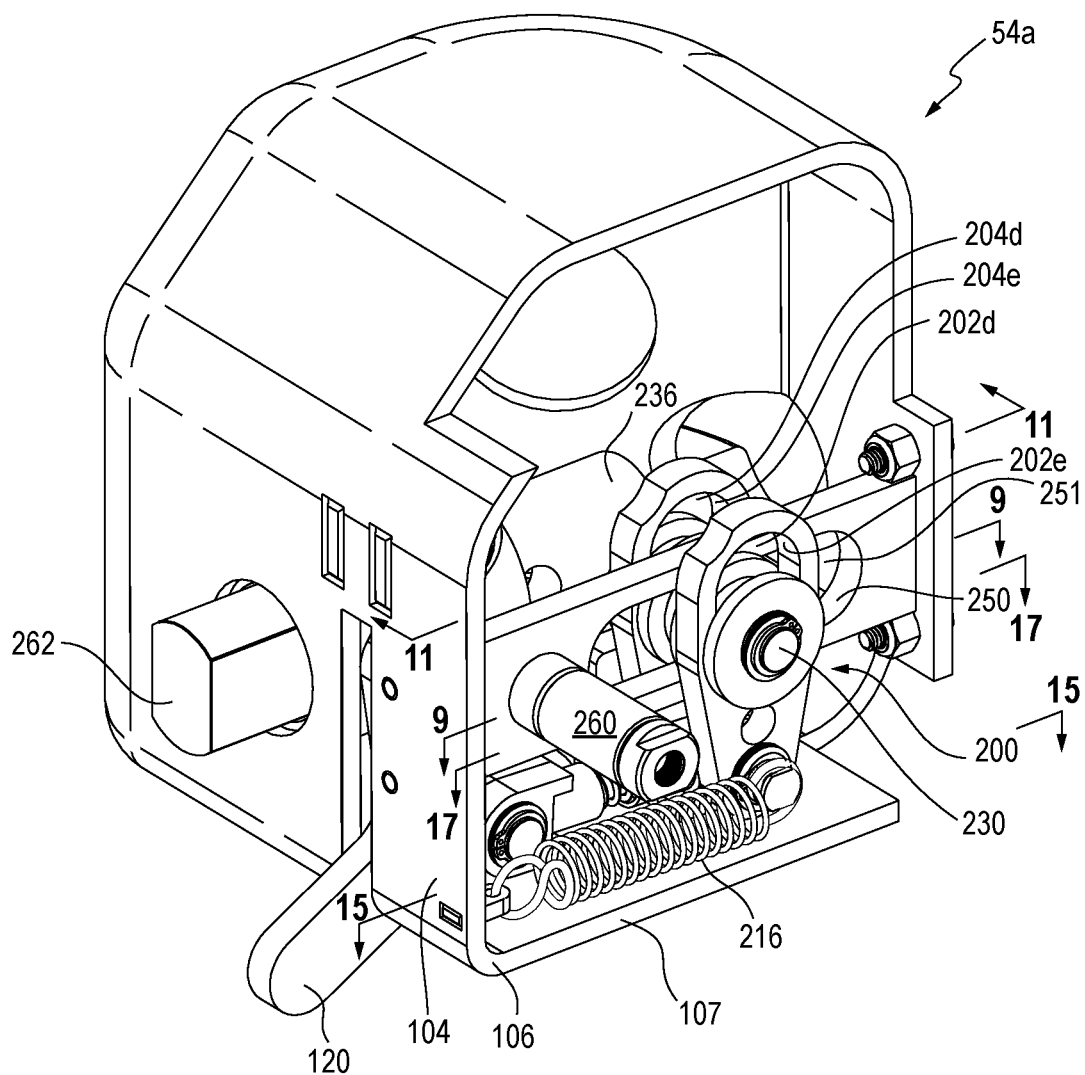
FIGS. 7 and 8 are top rear and top side isometric views, respectively, of one of the container retention devices of FIG. 2 shown in a latching state.
Figure 8:
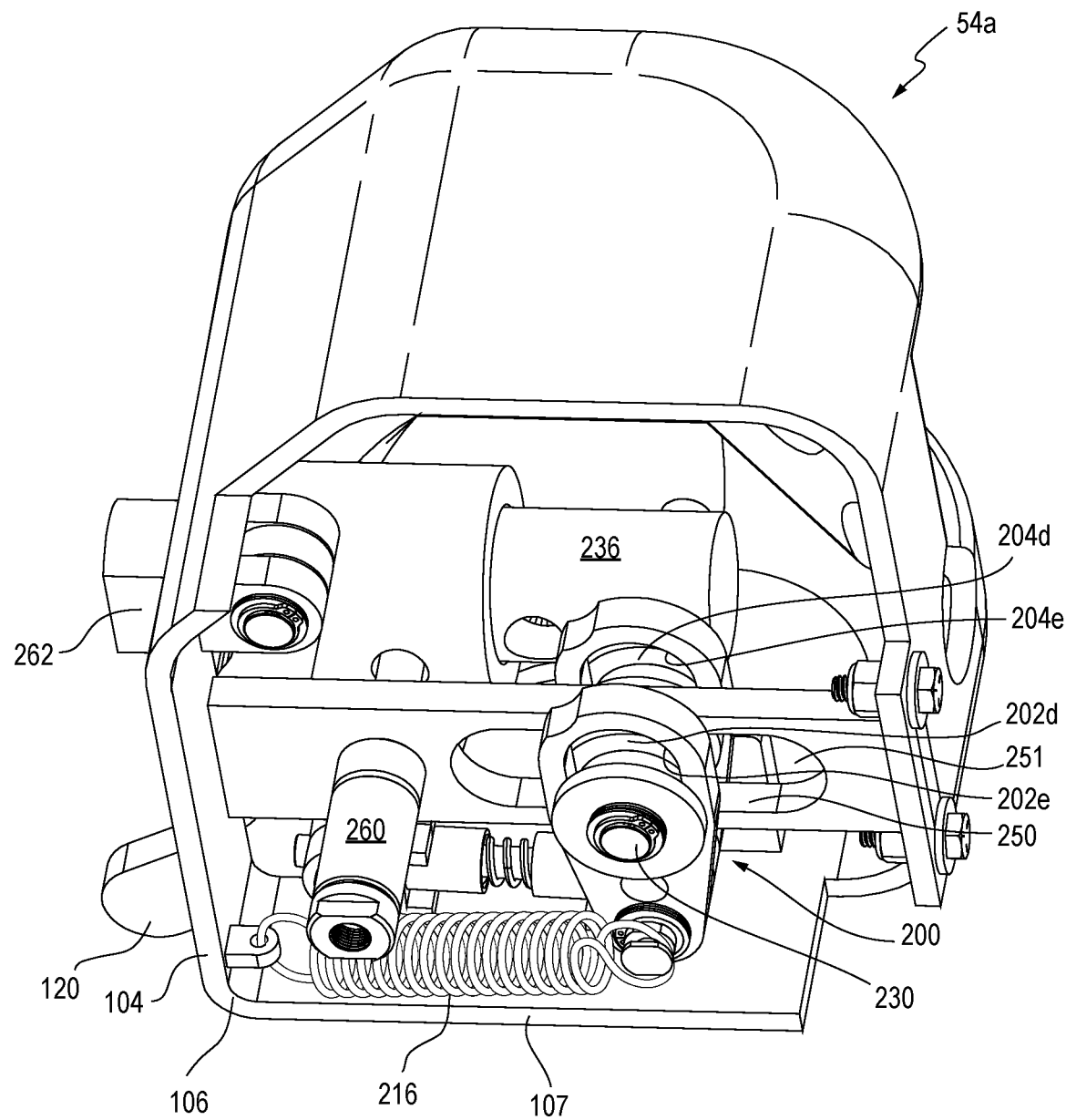
Figure 11:
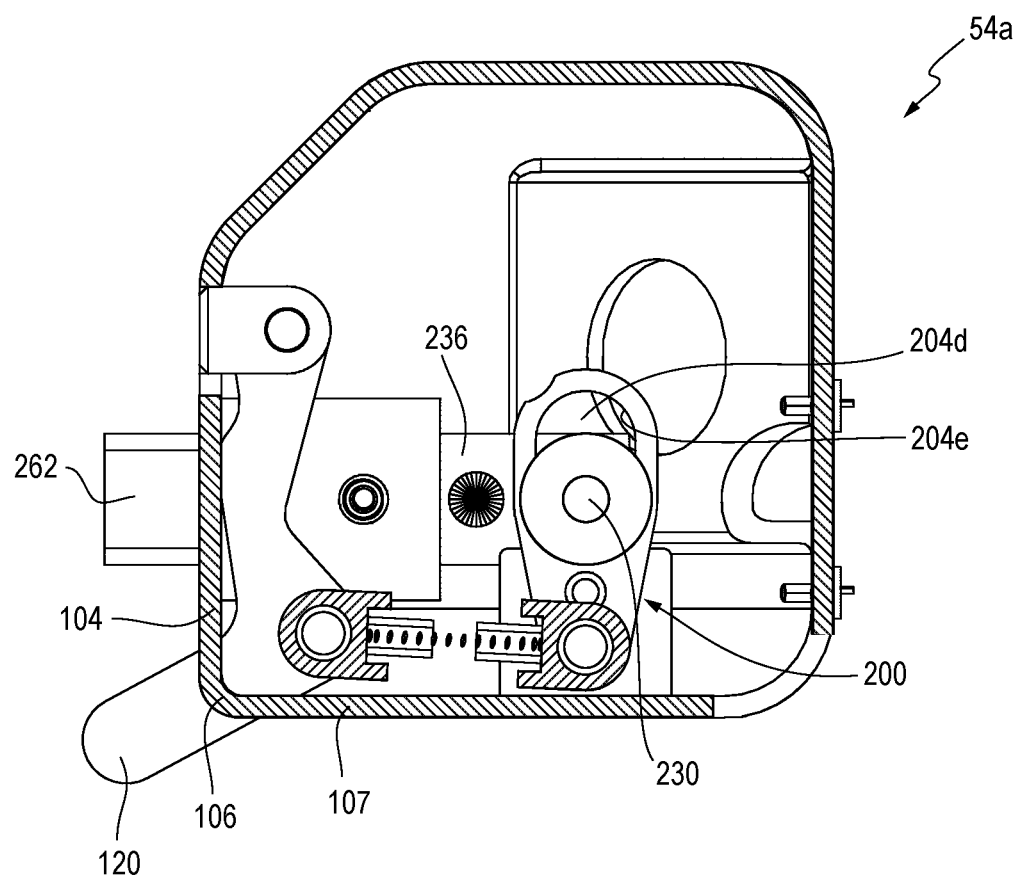
FIG. 11 is a sectional view taken generally along the lines 11-11 of FIG. 7.

Referring also to FIGS. 7, 8 and 11, movement of the second portion 156 in the direction of the arrow 272 causes the second link assembly 200 to rotate about the pin 222 in a counterclockwise direction (as seen in FIG. 11). Such rotation initially causes the bearings 238 and 240 seen in FIGS. 9 and 10 to move down in the elongate slots 202d, 204d and the bearings 244 to move to the left in the slot 251 as illustrated in FIG. 7. The bearings 238, 240 eventually move upwardly in the slots 202d, 204d, respectively, as the bearings 244 continue to move to the left in the slot 251. The latch 236 and locking member 262 are carried by the second link assembly 200, if not blocked or prevented by movement as noted above. Eventually, the locking member 262 moves to a fully extended position through the opening 84a into the casting 70a when the container 52 is fully seated on the chassis 50. The shapes and sizes of the surfaces 202e, 204e, and 250 defining the slots 202d, 204d, and 251, respectively, and the diameters of the outer races of the bearings 238, 240, and 244 are selected to ensure smooth operation of the retention device 54a.

Figure 18:
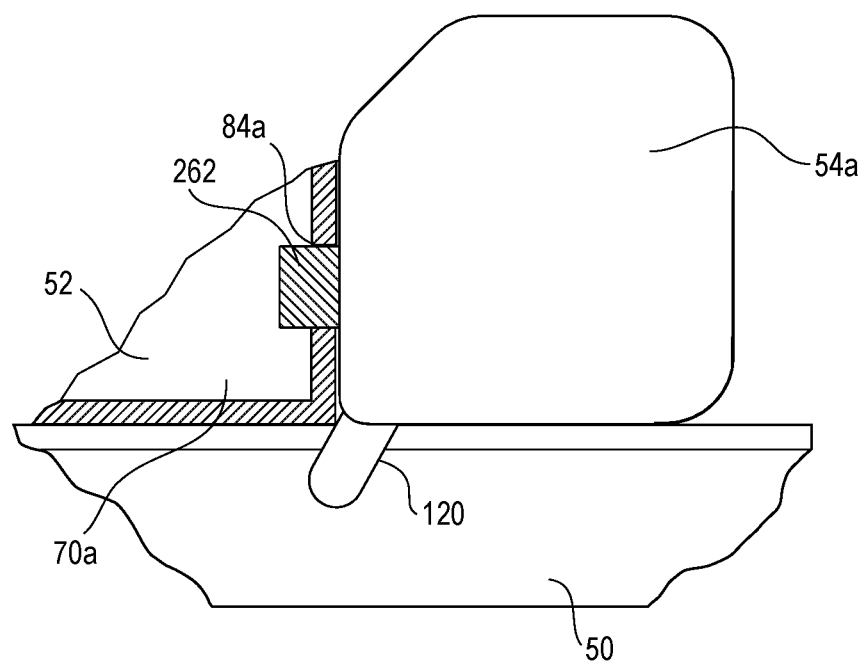
FIG. 18 is a simplified fragmentary sectional view, taken generally along the lines 18-18 of FIG. 2, of the container latched to the chassis by the container retention device.

A seen in FIG. 18, the relative sizes of the locking member 262 and the opening 84a and the space inside the casting 70a results in secure retention of the respective corner of the container 52 on the chassis 50. Referring again to FIGS. 4-10 at such time, the actuation mechanism 260 may be automatically or selectively operated to move the plunger 261 into the bore 254. In one embodiment, the actuation mechanism 260 is spring-loaded so that when the bore 254 moves into alignment with the plunger 261, the actuation mechanism 260 automatically moves the plunger 261 under spring force into the bore 254. In another embodiment, the actuation mechanism 260 is operated by a control device (not shown) to extend the plunger 261 into the bore 254, and thereby lock the container 52 to the chassis 50 until released as noted below.

The other retention device 54a operates in the same manner to secure the remaining front casting 70b, and hence, the remaining front corner of the container 52, automatically to the chassis 50 when the container 52 is moved into engagement therewith.

The rear castings 72a, 72b may be locked to the chassis 50 by the container retention devices 64a, 64b, which may be of the type disclosed in co-owned U.S. Pat. Nos. 9,387,792, 9,463,732, 9,802,526, and/or 9,340,146 incorporated by reference herein. Alternatively, rear container retention devices could be used to secure the rear corners of the container 52 to the chassis 50 that are identical or similar to the front container retention devices 54a, 54b with the exception that the rear retention devices include forwardly extending latches and locking members, as opposed to the rearwardly extending latches and locking members of the retention devices 54a, 54b.

The retention devices 54a, 54b (and remaining retention devices) may be selectively released from the container 52 by operating the actuation mechanisms 260 to retract the plungers 261 (or other structures) from the bores 254. Such operation may be undertaken automatically when a condition arises, such as locking of vehicle brakes, or may be undertaken manually when a pressurized fluid is applied to or exhausted from the mechanism 260 when a fluidic device is used therefor, or when electric power is supplied to or removed from the mechanism 260 when a solenoid is used as the mechanism 260, or when a handle (not shown) is used to extend and/or retract the plunger 261 whether a spring force is or is not applied to the plunger 261, etc.

Preferably, the retention devices 54 are failsafe in nature such that, if there is a loss of fluid pressurization or electrical power that occurs while the chassis 50 is in motion the retention devices 54 maintain the locking member 262 and the arm 261 in the extended positions maintain securement of the container 52 to the container chassis 50.

INDUSTRIAL APPLICABILITY

In summary, the container retention devices 54 automatically secure the container 52 to the chassis 50 when the container 52 is placed on the chassis 50. The container 52 remains secured to the chassis 50 until selectively released.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A container retention device, comprising:
   a housing;
   an actuator having a first portion disposed in the housing and a second portion movable between a first position inside the housing to a second position outside the housing;
   a first link assembly in the housing engageable by the first portion of the actuator and movable in response to movement of the second portion between the first and second positions;
   a second link assembly disposed in the housing having a third portion engageable by the first link, a fourth portion, and a fifth portion disposed between the third portion and the fourth portion wherein the third portion and the fourth portion are rotatable about the fifth portion in response to movement of the first link assembly; and
   a locking member extendable outside the housing in response to movement of the second portion to the first position.

2. The container retention device of claim 1, wherein the actuator is movable along a first path and the first link assembly is movable along a second path substantially parallel to the first path.

3. The container retention device of claim 2, wherein the first link assembly comprises a spring that is compressed when the second portion is moving toward the first position and the locking member is blocked.

4. The container retention device of claim 1, wherein the second link assembly is pivotably coupled to an anchor plate that is stationary with respect to the housing.

5. The container retention device of claim 1, wherein a latch includes the locking member and wherein the second link assembly comprises a slot defined by walls engaged by a first bearing coupled to the latch.

6. The container retention device of claim 1, wherein a latch includes the locking member and wherein the second link assembly comprises spaced first and second link assembly arms wherein the first and second link assembly arms include first and second slots defined by first and second walls, respectively, engaged by spaced first and second sets of bearings, respectively, coupled to the latch.

7. The container retention device of claim 6, wherein a third set of bearings is carried by the latch and engages a racetrack-shaped surface of a member secured to the housing.

8. The container retention device of claim 7, wherein the latch is coupled to a shaft that carries the spaced first, second and third bearing sets.

9. The container retention device of claim 1, further including a controllable actuation mechanism for preventing movement of the locking member when the locking member is extended outside the housing.

10. The container retention device of claim 9, wherein the controllable actuation mechanism is selectively operable to allow movement of the locking member.

11. A container retention device, comprising:
    a housing;
    an actuator having a first portion disposed in the housing and a second portion movable between a first position inside the housing to a second position outside the housing;
    a first link assembly in the housing engageable by the first portion of the actuator and movable in response to movement of the second portion between the first and second positions;
    a second link assembly disposed in the housing having a third portion engageable by the first link, a fourth portion, and a fifth portion disposed between the third portion and the fourth portion wherein the fifth portion is pivotably coupled to an anchor plate that is stationary with respect to the housing and the third portion and the fourth portion are rotatable about the fifth portion in response to movement of the first link assembly;
    a latch having a locking member movable to a position outside the housing in response to movement of the second portion to the first position;
    wherein the second link assembly comprises a slot defined by walls engaged by a bearing set coupled to the latch;
    a shaft carried by the latch; and
    a further set of bearings mounted on the shaft wherein the further set of bearings engages a racetrack-shaped surface of a member secured to the housing.

12. The container retention device of claim 11, wherein the actuator is movable along a first path and the first link assembly is movable along a second path substantially parallel to the first path.

13. The container retention device of claim 12, wherein the first link assembly comprises a spring that is compressed when the second portion is moving toward the first position and the locking member is blocked.

14. The container retention device of claim 11, wherein the walls defining the slot comprise first walls defining a first slot, wherein the second link assembly comprises spaced first and second link assembly arms that include the first walls defining the first slot and second walls defining a second slot, respectively, and the further bearing set engages the first walls and a still further set of bearings engages the second walls.

15. The container retention device of claim 14, wherein the latch is coupled to a shaft that carries the bearing set, the further bearing set, and the still further bearing set.

16. The container retention device of claim 15, further including a controllable actuation mechanism for preventing movement of the locking member when the locking member is extended outside the housing.

17. The container retention device of claim 16, wherein the controllable actuation mechanism is selectively operable to allow movement of the locking member.

18. A container retention method, comprising the steps of:
disposing an actuator having a first portion in a housing and a second portion movable between a first position inside the housing to a second position outside the housing;
disposing a first link assembly in the housing engageable by the first portion of the actuator and movable in response to movement of the second portion between the first and second positions;
disposing a second link assembly in the housing having a third portion engageable by the first link, a fourth portion, and a fifth portion disposed between the third portion and the fourth portion wherein the third portion and the fourth portion are rotatable about the fifth portion in response to movement of the first link assembly;
providing a locking member extendable from a third position inside the housing to a fourth position outside the housing in response to movement of the fourth portion; and
moving a container into contact with the second portion of the actuator while the second portion is disposed at the second position and the locking member is disposed at the third position to move the second portion toward the first position such that the first link assembly rotates the second link assembly about the fifth portion and the fourth portion moves the locking member to the fourth position.

19. The container retention method of claim 18, including the further step of providing an actuation mechanism having a plunger movable into engagement with a bore to prevent movement of the locking member at the fourth position.

20. The container retention method of claim 19, wherein the step of disposing the first link assembly includes the step of providing a spring between portions of the first link assembly to take up motion when the locking member is prevented from moving to the fourth position.

* * * * *